(12) United States Patent
Jensen et al.

(10) Patent No.: US 7,797,616 B2
(45) Date of Patent: Sep. 14, 2010

(54) VIRTUAL DISPLAY DRIVER

(75) Inventors: David A. Jensen, American Fork, UT (US); Eric D. Fagerburg, Orem, UT (US)

(73) Assignee: Intel Corporation, Santa Clara, CA (US)

( * ) Notice: Subject to any disclaimer, the term of this patent is extended or adjusted under 35 U.S.C. 154(b) by 975 days.

(21) Appl. No.: 11/374,932

(22) Filed: Mar. 13, 2006

(65) Prior Publication Data

US 2006/0156285 A1   Jul. 13, 2006

Related U.S. Application Data

(62) Division of application No. 09/573,043, filed on May 15, 2000, now Pat. No. 7,043,697.

(51) Int. Cl.
*H03M 13/03* (2006.01)

(52) U.S. Cl. .................. 714/788; 714/778; 714/800

(58) Field of Classification Search .......... 715/788, 715/778, 800, 318, 328, 232; 395/329; 709/235; 714/788, 778, 800, 318, 328, 232
See application file for complete search history.

(56) References Cited

U.S. PATENT DOCUMENTS

| | | | |
|---|---|---|---|
| 5,732,211 A | 3/1998 | Efron et al. | |
| 5,732,212 A | 3/1998 | Perholtz et al. | |
| 5,734,828 A | 3/1998 | Pendse et al. | |
| 5,758,110 A | 5/1998 | Boss et al. | |
| 5,812,848 A | 9/1998 | Cohen | |
| 6,085,247 A | 7/2000 | Parsons, Jr. et al. | |
| 6,141,022 A | 10/2000 | Anfossi et al. | |
| 6,173,332 B1 | 1/2001 | Hickman | |
| 6,205,492 B1 | 3/2001 | Shaw et al. | |
| 6,212,574 B1 | 4/2001 | O'Rourke et al. | |
| 6,222,529 B1 | 4/2001 | Ouatu-Lascar et al. | |
| 6,226,725 B1 * | 5/2001 | Yarborough | 711/170 |
| 6,263,363 B1 | 7/2001 | Rosenblatt et al. | |
| 6,282,646 B1 | 8/2001 | Hendry et al. | |
| 6,323,875 B1 * | 11/2001 | Millman et al. | 345/619 |
| 6,337,717 B1 | 1/2002 | Nason et al. | |
| 6,473,781 B1 | 10/2002 | Skagerwall et al. | |
| 6,629,143 B1 * | 9/2003 | Pang | 709/226 |
| 6,918,113 B2 * | 7/2005 | Patel et al. | 717/178 |
| 7,043,524 B2 * | 5/2006 | Shah et al. | 709/203 |

OTHER PUBLICATIONS http://support.microsoft.com/support/kb/articles/Q229/6/64.ASP, "INFO: Hooking Display Drivers Through the Display Driver Management Layer in Windows 2000".

* cited by examiner

*Primary Examiner*—Fritz Alphonse
(74) *Attorney, Agent, or Firm*—Trop, Pruner & Hu, P.C.

(57) ABSTRACT

A virtual display driver that can be dynamically loaded and unloaded for remote control of a host computing system. The host computing system includes an original display driver that updates an output display of the computing system based on display commands. A remote control executive executes in kernel-mode within an operating environment provided by the computing system and dynamically loads and unloads the virtual display driver as requested by a user. The remote control executive inserts hooks within the functions provided by the original display driver to trap the display commands received by the original display driver and direct the commands to the virtual display driver for communication to a remote client computer.

12 Claims, 6 Drawing Sheets

VIRTUAL DISPLAY DRIVER

CROSS-REFERENCE TO RELATED APPLICATIONS

This application is a divisional (and claims the benefit of priority under 35 USC 120) of U.S. application Ser. No. 09/573,043, filed May 15, 2000, now U.S. Pat. No. 7,043,697; the disclosure of the prior application is considered part of (and is incorporated by reference in) the disclosure of this application.

BACKGROUND

This invention relates to the remote control of a host computer from a remote client computer.

There are several commercially available software applications, such as PCAnywhere™ from Symantec™ of Cupertino, Calif., that allow a user to remotely control a host computer. The ability to remotely control a host computer can be used in a variety of computing applications including training and support from remote consultants and telecommuting by remote employees. For example, a professional at a remote help-desk can connect to a computer and remotely diagnose hardware or software problems, thereby reducing costs associated with traveling to sites.

Conventional software applications typically transmit raster data from the host computer to the client computer in order to synchronize the displays. The applications utilize a "mirroring" function provided by an operating system executing on the host in order to access the output raster data. The operating system typically requires that the software application be loaded upon power-up of the host.

DESCRIPTION

Figure 1:
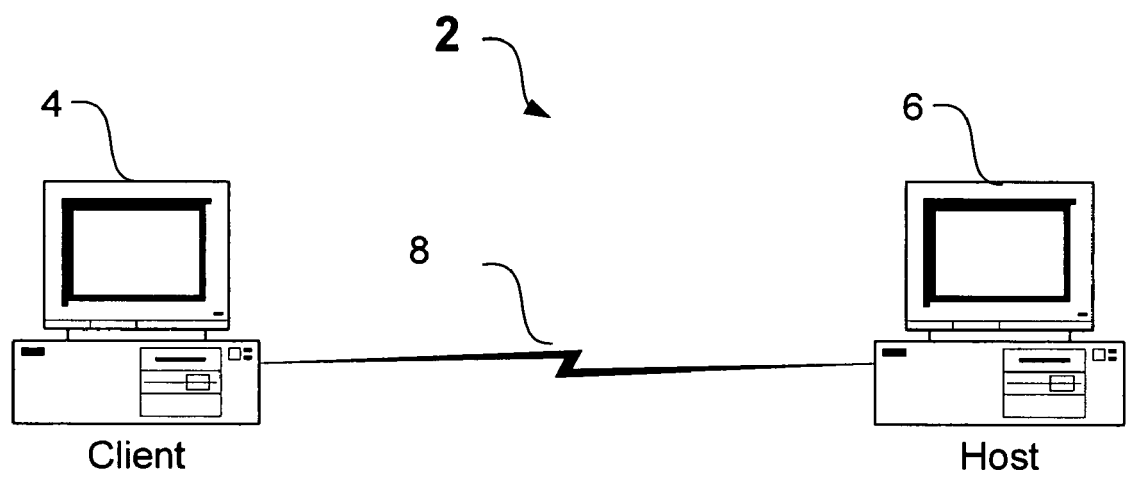
FIG. 1 is a block diagram illustrating a system in which a client computer is used to remotely control a host computer.

FIG. 1 is a block diagram illustrating a computing environment 2 in which client computer 4 is communicatively coupled to host computer 6 via communication link 8. Communication link 8 represents any communication link suitable for communicating data. For example, a serial cable or a parallel cable may directly couple client computer 4 and host computer 6. Alternatively, a telephone connection or wireless link can be established using modems. In addition, communication link 8 can be a packet-switched network such as a local area network or the Internet.

Host computer 6 is configured such that a user operating client computer 4 can remotely access and control host computer 6 as if the user were local. More specifically, client computer 4 provides a user interface that replicates the user interface provided by host computer 6. Client computer 4 forwards any input received from the user to host computer 6 via communication link 8. Unlike conventional systems that generally communicate raster data, host computer 6 directs graphic display commands to client computer 4 for updating the user interface. In this manner, the user can remotely control host 6 using client computer 4 as if the user were directly accessing host computer 6.

Figure 2:
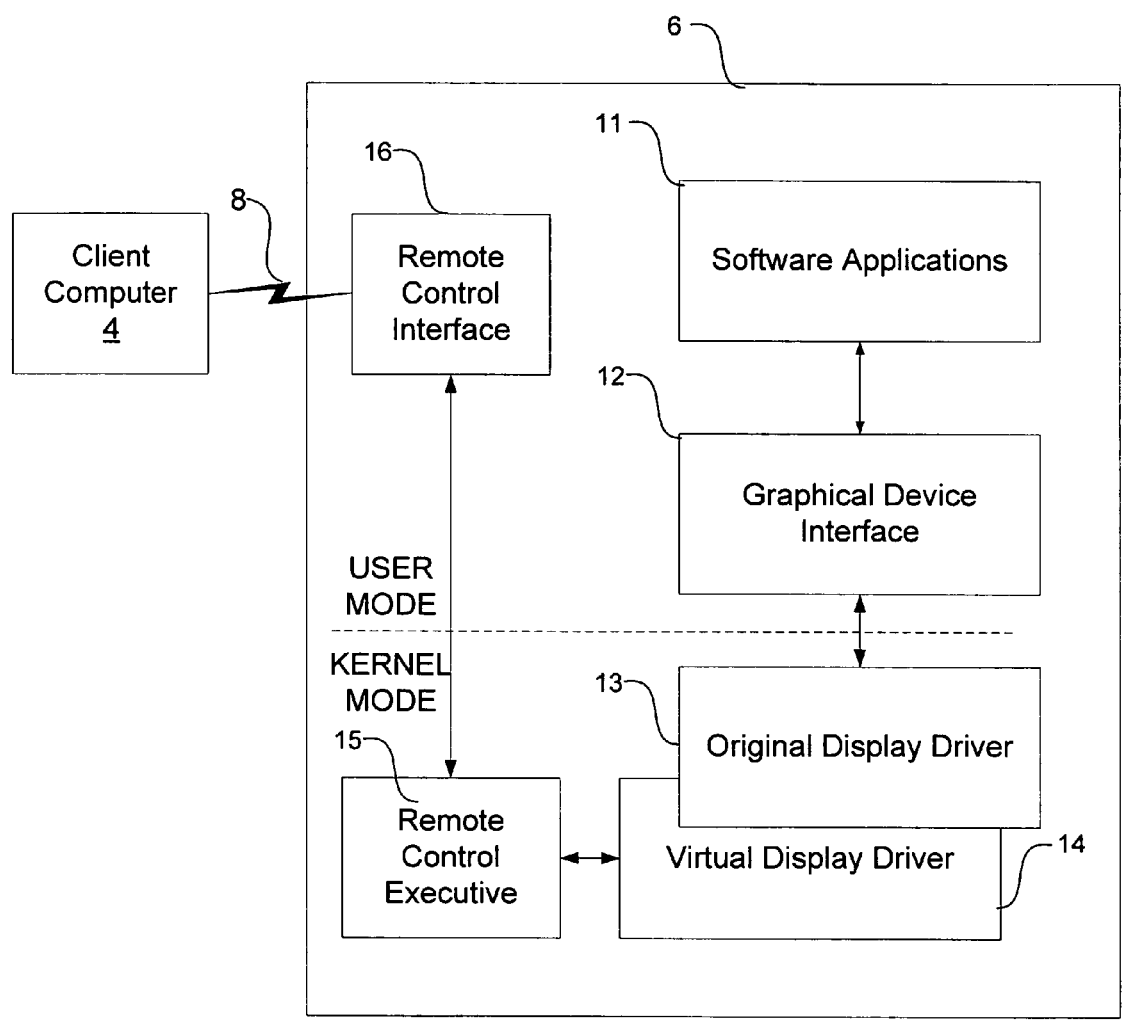
FIG. 2 is a block diagram providing a high-level illustration of the various components of the invention.

FIG. 2 is a block diagram illustrating one embodiment of a number of software components executing within an operating environment provided by host computer 6. The components execute in either user-mode or kernel-mode. Kernel-mode components, unlike user-mode components, are able to access system resources such as system memory without generating an access violation. Software applications 11, graphical device interface (GDI) 12 and remote control interface 16 execute in user-mode. Original display driver 13, virtual display driver 14 and remote control executive 15 execute in kernel-mode.

Software applications 11 represent conventional software applications such as word processing applications and spreadsheet applications. GDI 12 provides a standard interface by which software applications 11 construct graphical objects and output them on output devices, such as monitors and printers. Software applications 11 invoke functions provided by GDI 12 in order to form the graphical display. GDI 12 invokes functions provided by original display driver 13 and drives original display driver 13 with display commands in order to construct the graphical display. Original display driver 13 processes the commands and outputs raster data for driving the output display of host computer 6.

As explained in detail below, remote control interface 16 and remote control executive 15 provide a mechanism for dynamically loading and unloading virtual display driver 14 without requiring that host computer 6 be rebooted. When loaded, virtual display driver 14 monitors the commands received by original display driver 13 and, in one configuration, communicates the commands to client computer 4 via network 8. In another configuration, as illustrated in FIG. 2, virtual display driver 14 communicates the graphics commands to remote control executive 15, which in turn forwards the commands to remote control interface 16 for transmission to client computer 4 via communication link 8. Forwarding the graphic commands has several advantages over forwarding raster data. For example, communicating the display commands consumes significantly less bandwidth than communicating the output raster data generated by original device driver 13.

Figure 3:
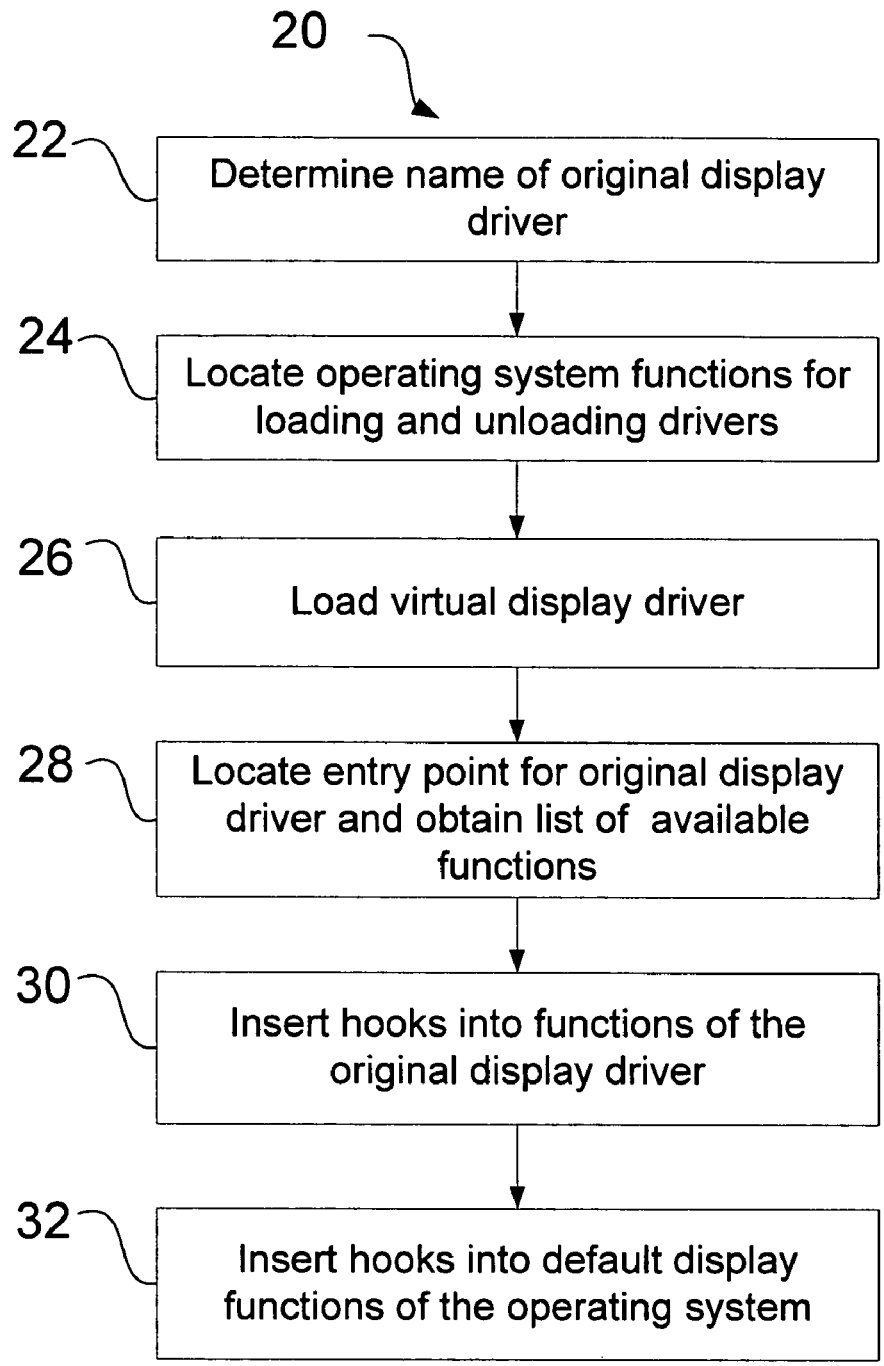
FIG. 3 and FIG. 4 are flowcharts illustrating processes for loading and unloading a virtual display driver according to an example embodiment.

FIG. 3 illustrates one example embodiment of a process 20 for dynamically loading virtual display driver 14 in order to communicate display commands from host computer 6 to client computer 4 via remote control executive 15, remote control interface 16 and network 8.

First, remote control interface 16 identifies the original display driver 13 that is currently loaded on host computer 6. If host computer 6 is running the Windows™ operating system provided by Microsoft™ of Redmond, Wash., remote control interface 16 scans a system registry in order to determine the original display driver 13 that is currently loaded (22). The registry is a central database maintained by the operating system that contains system information. Remote control interface 16 scans the "HKEY_Local_Machine" section of the registry and retrieves a string name associated with original display driver 13.

Next, as explained in detail below, remote control interface 16 interacts with remote control executive 15 in order to locate internal functions used by the operating system to load and unload display drivers (24). For example, the Windows™ operating system uses an internal function "EngLoadImage" to load executable images for device drivers and a second function "EngUnloadImage" to unload the image.

Upon locating the functions provided by the operating system, remote control executive 15 loads an executable image of virtual display driver 14 by invoking the appropriate internal function (26). For example, in a Windows environment, remote control executive 15 calls EngLoadImage to load virtual display driver 14 into the operating environment provided by host 6.

Next, as explained in detail below, remote control executive 15 locates an entry point for original display driver 13 loaded on host computer 6. The entry point to a device driver is a function that returns a data structure identifying available functions provided by original display driver 13 (28). In addition, remote control executive 15 locates an entry point for virtual display driver 14 loaded on host computer 6 in order to obtain addresses for functions provided by the virtual display driver 14 after dynamic loading (28).

Next, remote control executive 15 inserts a "hook" into each function of original display driver 13 causing original display driver 13 to direct display commands received from GDI 12 to virtual display driver 14 (30). In one example implementation, remote control executive 15 overwrites the first five bytes of each function with a jump statement to an appropriate entry point in virtual display driver 14 depending on the function being hooked. Virtual display driver 14 saves the five bytes such that original display driver 13 can be fully restored to call the original function or when virtual display driver 14 is unloaded.

In addition remote control executive 15 inserts a similar hook into each default display function provided by the operating system (32). This ensures that all graphic commands are directed to client computer 4 even if display driver 13 does not implement all display functions, thus causing the default functions to be invoked.

After the hooks are inserted, any software application 11 that invokes GDI 12 is redirected from original display driver 13 to an appropriate entry point within virtual display driver 14. Virtual display driver 14 communicates the graphics commands generated by GDI 12 to remote computer 4. For example, in one implementation, virtual display driver 14 generates a stream of data packets communicating the graphics commands to remote computer 4 over a packet-switched network. After communicating the graphic commands, virtual display driver 14 calls the original function within original display driver 13 in order to update the local display provided by host computer 6. Alternatively, virtual display driver 14 invokes the function within original display driver 13 prior to communicating the graphics commands to client computer 4.

Figure 4:
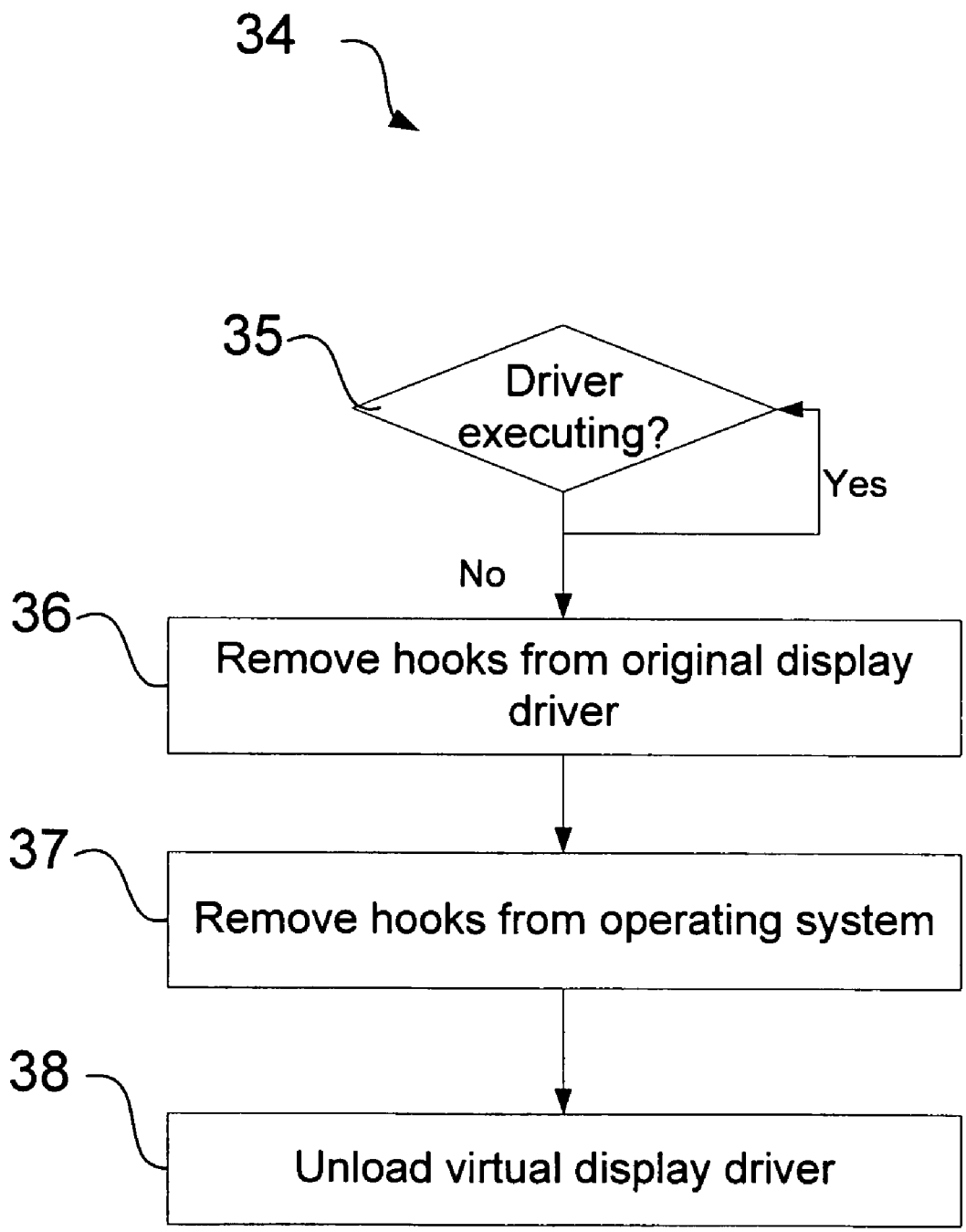

FIG. 4 illustrates one embodiment of a process 34 for unloading virtual display driver 14 from host computer 6. First, remote control executive 15 determines whether a thread of execution for any software application 11 is currently executing within virtual display driver 14 (35). If so, remote control executive 15 waits until the virtual display driver 14 is idle.

Once virtual display driver 14 is idle, remote control executive 15 removes the hooks from original display driver 13 (36). More specifically, remote control executive 15 replaces the jump statements that were inserted in each function call with the original code that was overwritten. Similarly, remote control executive 15 removes the hooks from the default display functions provided by the operating system (37).

Finally, remote control executive 15 unloads the executable image of virtual display driver 14 by invoking the appropriate internal function provided by the operating system as identified above (24). For example, in a Windows environment, remote control executive 15 calls EngUnloadImage to unload virtual display driver 14.

Processes 20 and 34, of FIGS. 3 and 4 respectively, have been described for dynamically loading and unloading virtual display driver 14. In this manner, a user can remotely control host machine 6 from client machine 4 without requiring that host machine 6 first be rebooted. This is advantageous in that virtual display driver 14 need only be resident during remote control periods, thereby limiting the consumption of system resources. In addition, virtual display driver 14 advantageously communicates graphic commands, instead of raster data, to client computer 4, thereby consuming less bandwidth from communication link 8.

Figure 5:
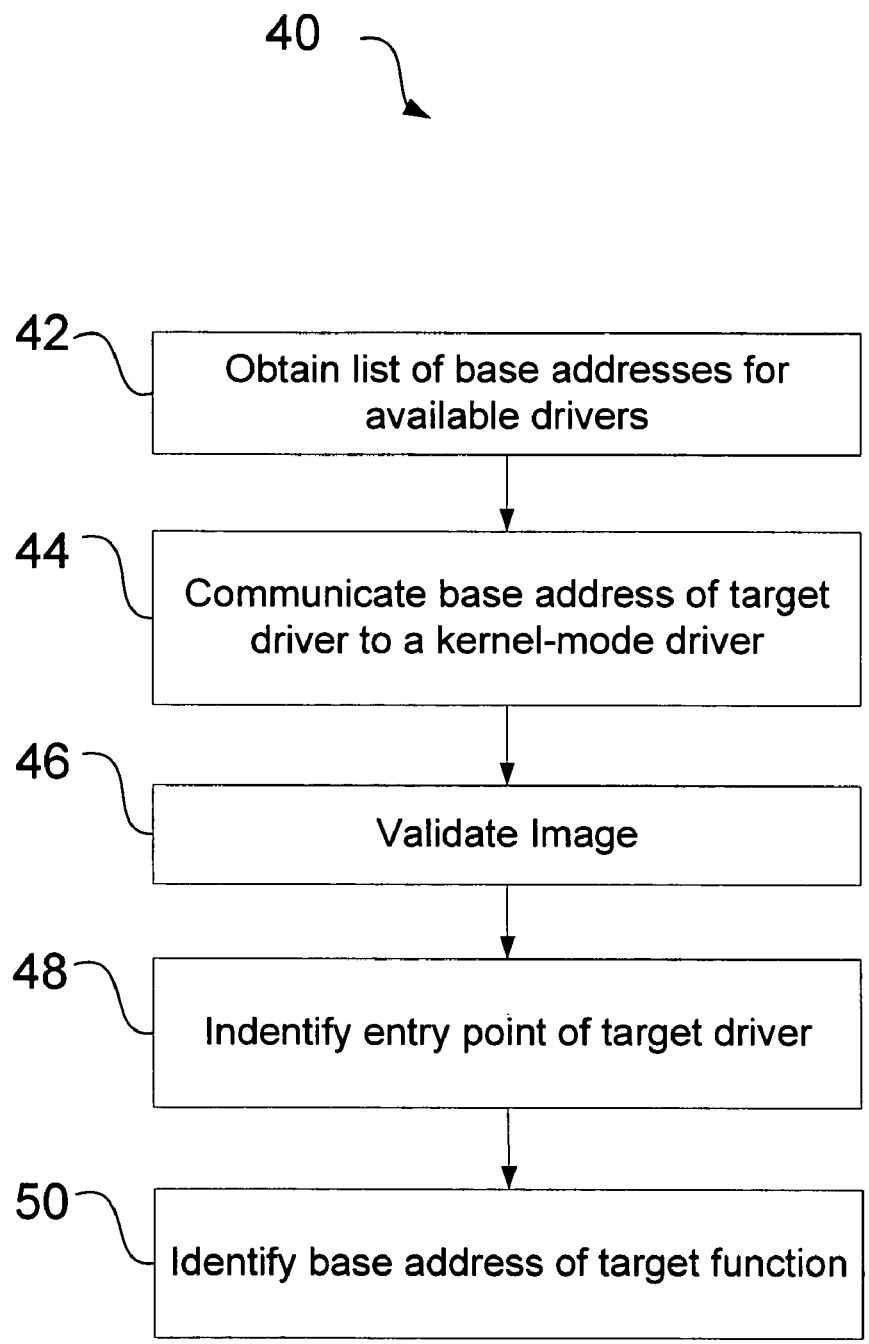
FIG. 5 is a flowchart illustrating a process for identifying and locating functions provided by kernel-mode software modules.

FIG. 5 illustrates one embodiment of a process 40 for determining the addresses of functions, and their corresponding base addresses, provided by a software module operating in kernel-mode. For example, process 40 is invoked in step 24 of process 20 (FIG. 3) in order to locate functions provided by the operating system for loading and unloading device drivers. In addition, process 40 is invoked in step 28 to locate the base address of the original display driver 13.

Remote control interface 16 obtains a list of base addresses for available drivers (42). For example, the Windows operating system provides a function "NtQuerySystemInformation" that generates a list of currently loaded kernel-mode software modules, such as original display driver 13, and corresponding base addresses. Remote control interface 16 scans the list to identify the desired kernel-mode software module. For example, to locate functions provided by the operating system for loading a display driver, remote control interface 16 scans the list for WIN32K.SYS. To locate the original display driver, remote control interface 16 scans the list for a name corresponding to the string retrieved from the registry in step 22 of FIG. 3.

Once the target kernel-mode software module is located, remote control interface 16 communicates the base address to remote control executive 15 operating in kernel-mode (44). In one implementation, remote control interface 16 uses an input/output (I/O) control call to pass the base address to remote control executive 15.

Upon receiving the base address, remote control executive 15 verifies that an executable image is loaded at the base address. For the Windows operating system, remote control executive 15 verifies that the image includes a valid Disk Operating System (DOS) header and a valid Portable Executable (PE) header, as required by the Windows operating system. More specifically, remote control executive 15 checks the first "e_magic" member of the DOS header for the signature "MZ". Next, remote control executive 15 checks the "e_lfanew" member of the PE header for a valid PE signature, which is "PE" followed by two zeroes. Finally, remote control executive 15 checks the PE header's "SizeofoptionalHeader" member to make sure an optional header exists.

Upon validating the image, remote control executive 15 examines the header information and locates the entry point of the target kernel-mode software module, (48). Next, if the addresses of exported functions other than the module's entry point are required, remote control executive 15 identifies a base address for each target function by examining the image export directory (50). In order to locate the export directory, remote control executive 15 examines the header information of the executable image. Remote control executive 15 scans the image export directory for each target function and returns a corresponding function address.

In the above-described manner, remote control executive 15 can locate the executable image for kernel-mode software modules and can determine the address for each available function. Process 40 can be invoked to locate the original display driver 13 as loaded on host computer 6. In addition, process 40 can be used to identify internal functions provided by the operating system, such as those necessary to load a display driver, that otherwise could not be accessed by user-mode software.

The invention can be implemented in computer software, hardware, firmware, digital electronic circuitry or in combinations thereof. Furthermore, the invention can be implemented in one or more computer programs that are executable within an operating environment of a programmable system embodied and tangibly stored in a machine-readable storage device.

Figure 6:
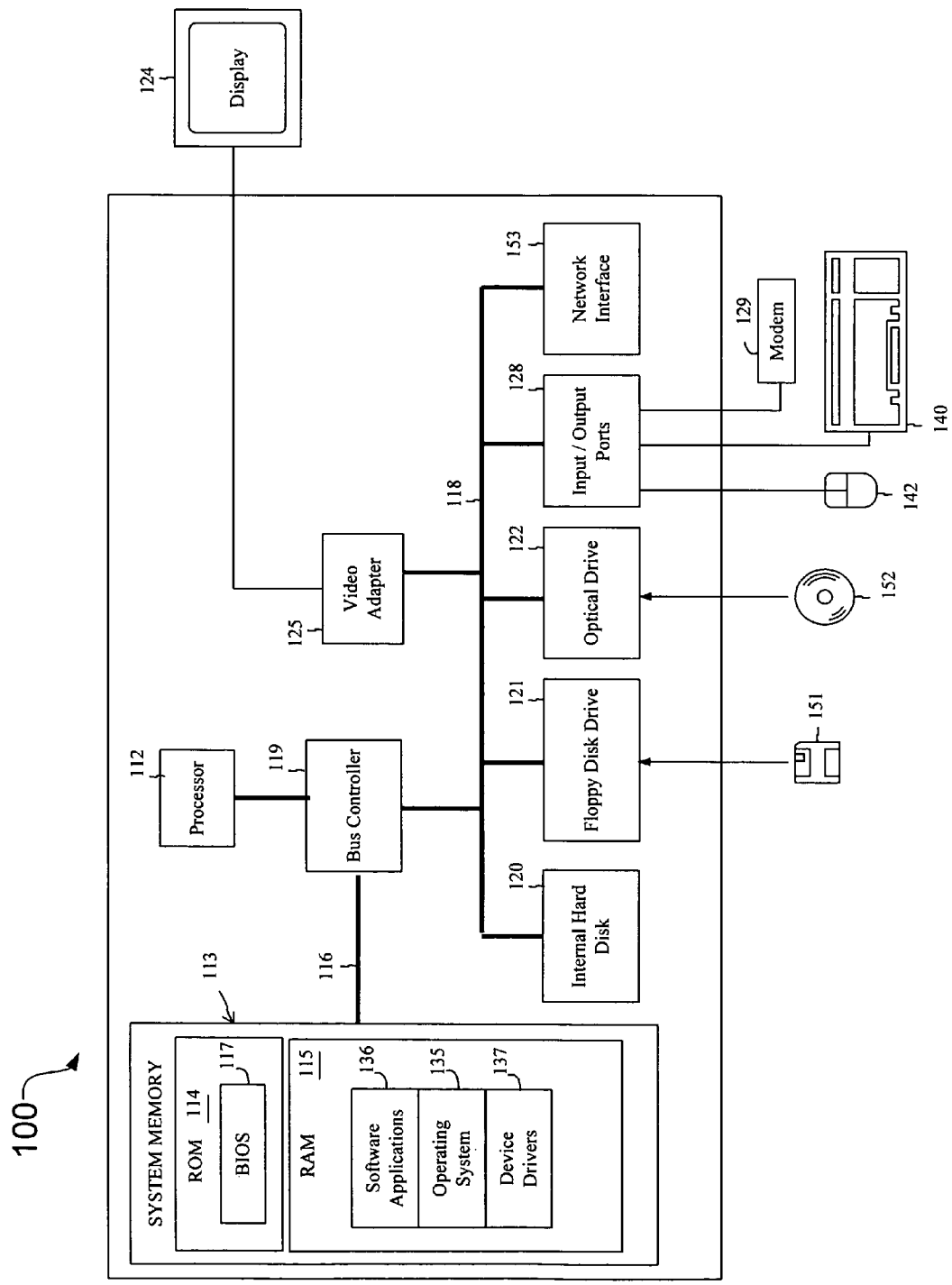
FIG. 6 is a block diagram illustrating one example embodiment of a computer suitable for implementing the various embodiments of the invention.

FIG. 6 illustrates an example of a computer 100 suitable for use as client computer 4 or host computer 6 in order to implement or perform various embodiments of the invention. As shown in FIG. 6, the computer 100 includes a processor 112 that in one embodiment belongs to the PENTIUM® family of microprocessors manufactured by the Intel Corporation of Santa Clara, Calif. However, computer 100 can be implemented on computers based upon other microprocessors, such as the MIPS® family of microprocessors from the Silicon Graphics Corporation, the POWERPC® family of microprocessors from both the Motorola Corporation and the IBM Corporation, the PRECISION ARCHITECTURE® family of microprocessors from the Hewlett-Packard Company, the SPARC family of microprocessors from the Sun Microsystems Corporation, or the ALPHA® family of microprocessors from the Compaq Computer Corporation.

Computer 100 includes system memory 113, including read only memory (ROM) 114 and random access memory (RAM) 115, which is connected to the processor 112 by a system data/address bus 116. ROM 114 represents any device that is primarily read-only including electrically erasable programmable read-only memory (EEPROM), flash memory, etc. RAM 115 represents any random access memory such as Synchronous Dynamic Random Access Memory.

Within the computer 100, input/output bus 118 is connected to the data/address bus 116 via bus controller 119. In one embodiment, input/output bus 118 is implemented as a standard Peripheral Component Interconnect (PCI) bus. The bus controller 119 examines all signals from the processor 112 to route the signals to the appropriate bus. Signals between the processor 112 and the system memory 113 are merely passed through the bus controller 119. However, signals from the processor 112 intended for devices other than system memory 113 are routed onto the input/output bus 118.

Various devices are connected to the input/output bus 118 including hard disk drive 120, floppy drive 121 that is used to read floppy disk 151, and optical drive 122, such as a CD-ROM drive that is used to read an optical disk 152. The video display 124 or other kind of display device is connected to the input/output bus 118 via a video adapter 125 and preferably is a high-resolution display suitable for viewing medical images. Computer 100 also includes a modem 129 and network interface 153 for communicating over communication link 8 via either a wired or wireless connection.

A user can enter commands and information into the computer 100 by using a keyboard 140 and/or pointing device, such as a mouse 142, which are connected to bus 118 via input/output ports 128. Other types of pointing devices (not shown in FIG. 1) include track pads, track balls, joysticks, data gloves, head trackers, and other devices suitable for positioning a cursor on the video display 124.

Software applications 136 and data are typically stored via one of the memory storage devices, which may include the hard disk 120, floppy disk 151, CD-ROM 152 and are copied to RAM 115 for execution. Operating system 135 executes software applications 136 and provides an operating environment for executing software applications 136 and for carrying out instructions issued by the user. The Basic Input/Output System (BIOS) 117 for the computer 100 is stored in ROM 114. BIOS 117 is a set of basic executable routines that help transfer information between the computing resources within the computer 100.

Various embodiments of the invention have been described. These and other embodiments are within the scope of the following claims. For example, as will be appreciated by those of ordinary skill in the art, the invention can be implemented using an article comprising a computer-readable medium, such as the system memory 113, the ROM 114, the RAM 115, the hard disk drive 120, the floppy disk 151, the optical disk 152, or combinations of one or more of them.

What is claimed is:

1. A computer implemented method for identifying functions provided by a target kernel-mode software module comprising:

locating a base address for a target kernel-mode software module loaded within a computer system;

communicating the base address to a software module executing in kernel-mode;

wherein the locating and the communicating are performed by the computer system, which is programmed to perform the locating and the communicating, wherein the base address represents a location in system memory of the computer system, the location corresponding to the target kernel-mode software module, which provides at least one function, and wherein communicating the base address includes communicating the base address from a software module executing in user-mode to the software module executing in kernel-mode.

2. The method of claim 1 and further including validating an executable image of the target kernel-mode software module.

3. The method of claim 1 and further including locating an entry point for the target kernel-mode software module.

4. The method of claim 1 and further including scanning an image export directory to locate a target function within the target software module.

5. An article comprising a computer-readable medium which stores computer-executable instructions, the instructions causing a computer to identify functions exported by a target kernel-mode software module by:

locating a base address for a target kernel-mode software module loaded within the computer; and communicating the base address to a software module executing in kernel-mode;

wherein the base address represents a location in memory of the computer, the location corresponding to the target kernel-mode software module, which provides at least one function, and wherein communicating the base address includes communicating the base address from a software module executing in user-mode to the software module executing in kernel-mode.

6. The article of claim 5 and further including instructions to cause the computer to validate an executable image of the target software module.

7. The article of claim 5 and further including instructions to cause the computer to identify an entry point for the target software module.

8. The article of claim 5 and further including instructions to cause the computer to scan an image export directory to locate a target function within the target software module.

9. A system comprising:
a processor;
input/output ports coupled with the processor;
a network interface coupled with the processor; and
a computer-readable medium operable to cause the processor to perform operations comprising:
locating a base address for a target kernel-mode software module loaded within the system; and
communicating the base address to a software module executing in kernel-mode;
wherein communicating the base address includes communicating the base address from a software module executing in user-mode to the software module executing in kernel-mode.

10. The system of claim 9, the operations further including validating an executable image of the target kernel-mode software module.

11. The system of claim 9, the operations further including locating an entry point for the target kernel-mode software module.

12. The system of claim 9, the operations further including scanning an image export directory to locate a target function within the target software module.

* * * * *